Nov. 1, 1960  H. J. WILLIAMS  2,958,376
STARTING CONTROL FOR INTERNAL COMBUSTION ENGINES
Filed March 7, 1956  4 Sheets-Sheet 1

INVENTOR.
HOWARD J. WILLIAMS
BY
P. C. Brodahl
ATTORNEY

INVENTOR.
HOWARD J. WILLIAMS
BY
ATTORNEY

Nov. 1, 1960  H. J. WILLIAMS  2,958,376
STARTING CONTROL FOR INTERNAL COMBUSTION ENGINES
Filed March 7, 1956  4 Sheets-Sheet 3
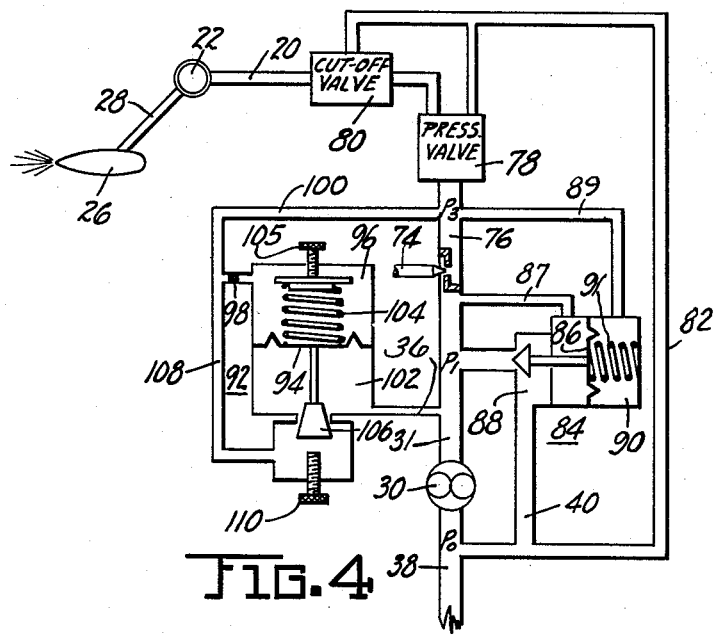
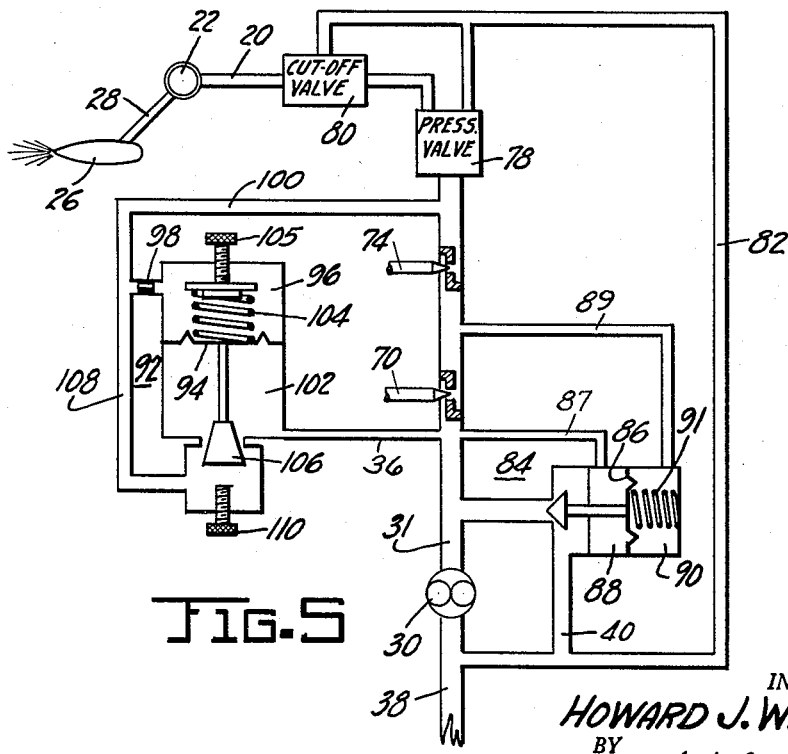
INVENTOR.
HOWARD J. WILLIAMS
BY
ATTORNEY INVENTOR.
HOWARD J. WILLIAMS
BY
*P.J.Brodahl*
ATTORNEY

United States Patent Office 2,958,376
Patented Nov. 1, 1960

2,958,376

STARTING CONTROL FOR INTERNAL COMBUSTION ENGINES

Howard J. Williams, South Bend, Ind., assignor to The Bendix Corporation, a corporation of Delaware Filed Mar. 7, 1956, Ser. No. 570,142

5 Claims. (Cl. 158—36.4)

The present invention relates to fuel control apparatus for an internal combustion engine and more particularly to a fuel control system for use in starting or initiating the operation of such an engine.

In starting or initiating the operation of an internal combustion engine, and more particularly a gas turbine type of engine, it is important that the fuel supply conduits and the fuel supply manifold for the fuel nozzles be initially filled and supplied with fuel at a very rapid rate. The fuel nozzle should be supplied with fuel as rapidly as can be practically accomplished to permit those fuel nozzles to momentarily discharge a high rate of fuel into the combustion chamber such that the resultant contact of the fuel with the igniter will start and support the combustion of the fuel.

Accordingly it is an object of the present invention to provide an improved fuel control apparatus for an internal combustion engine.

It is a different object of the invention to provide an improved starting fuel control apparatus for a gas turbine engine, which starting fuel control apparatus is operative to facilitate the starting of said engine.

It is another object of the present invention to provide an improved fuel control for a gas turbine engine which is operative to enable fuel to be initially supplied to the engine in sufficient quantity and in proper form to facilitate starting of the engine.

It is a further object to provide an improved fuel control which will be operative to successively and repeatedly start the operation of a gas turbine engine whenever desired and after the operation of that engine has been stopped.

It is a still additional object of the present invention to provide a fuel control apparatus for an internal combustion engine which fuel control apparatus is operative to facilitate the starting of that engine and is responsive to fuel pressures only within the system such that no problems are presented respecting leaks between fuel and atmosphere and such that the present control apparatus is not related to absolute pressures.

It is a still different object of the present invention to provide an improved fuel control which is operative to rapidly fill with fuel the fuel lines or conduits leading to the fuel manifold as well as the latter manifold, and to initially permit a high rate of fuel discharge into the combustion chambers such that the fuel nozzles generate a fuel spray as desirable for the proper contact of the fuel with the igniter to thereby start combustion of the fuel.

These and other objects and advantages of the present invention will be readily apparent from the following detailed description taken in connection with the accompanying drawings wherein:

Figure 4 is a schematic view of a second modification of the present invention;

Figure 5 is a schematic view of the third modification of the present invention;

Figure 1:
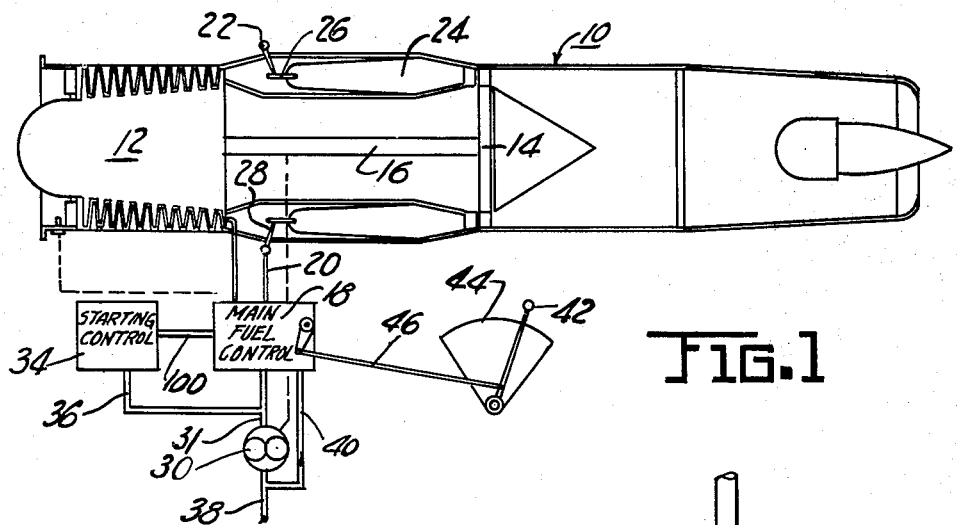
Figure 1 is a schematic view of a gas turbine type of internal combustion engine including fuel control apparatus in accordance with the present invention.

In Figure 1 there is shown a gas turbine engine 10 including a compressor unit 12, a turbine unit 14, which latter units are interconnected by a common drive shaft 16. Fuel is supplied by a main fuel control 18 through a fuel conduit 20 to the fuel supply manifold 22. A plurality of combustion chambers 24 are provided with each of these chambers including a fuel nozzle 26, with the fuel nozzles being connected to the fuel manifold 22 through individual fuel supply lines 28. An engine driven fuel pump 30 is provided for supplying fuel to the main fuel control through an outlet fuel conduit 31 and for supplying control fuel to the starting control 34 through a branch fuel conduit 36. An output fuel conduit 100 is connected from the starting control 34 to the main fuel control 18. Fuel is supplied to the fuel pump from a suitable source of supply through a fuel conduit 38. Fuel is by-passed back to the inlet fuel conduit 38 from the main fuel control 18 through a fuel conduit 40. A manual control throttle member 42 is provided for operation by the aircraft pilot or engine operator which throttle member is operative within a control quadrant 44 and is connected to the main fuel control 18 through a mechanical linkage arm 46.

Reference is here made to a copending patent application Serial No. 542,340 filed October 24, 1955, by R. C. Perkey and assigned to the same assignee as the present invention. This copending patent application relates to starting fuel control apparatus for an internal combustion engine.

Figure 2:
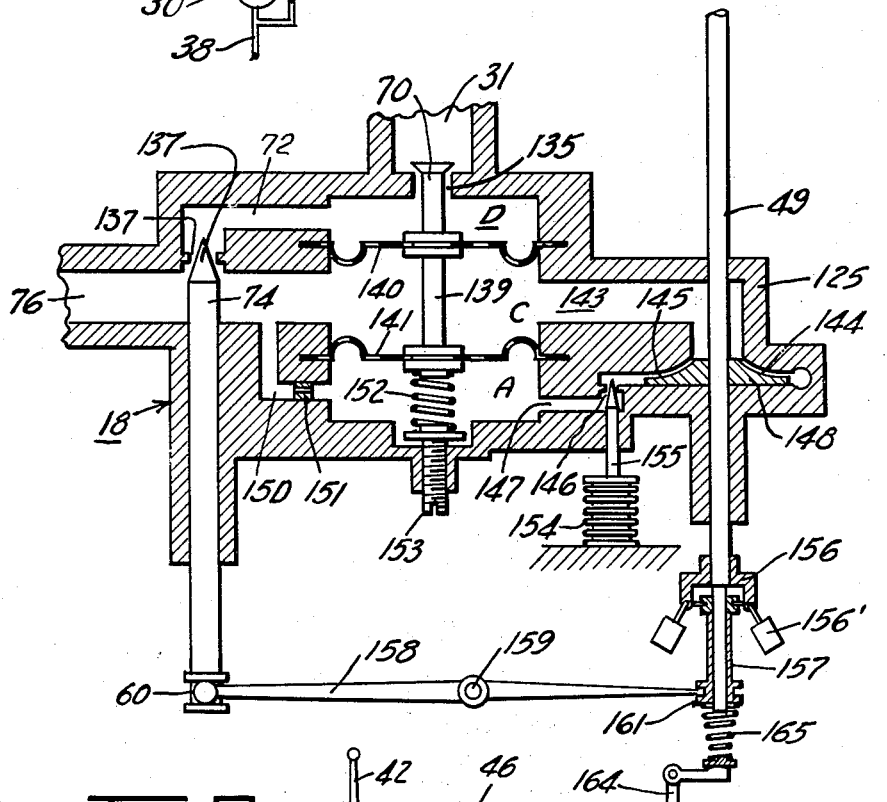
Figure 2 is a schematic and functional showing of one form of main control usable with the system shown in Figure 1.
Figure 3:
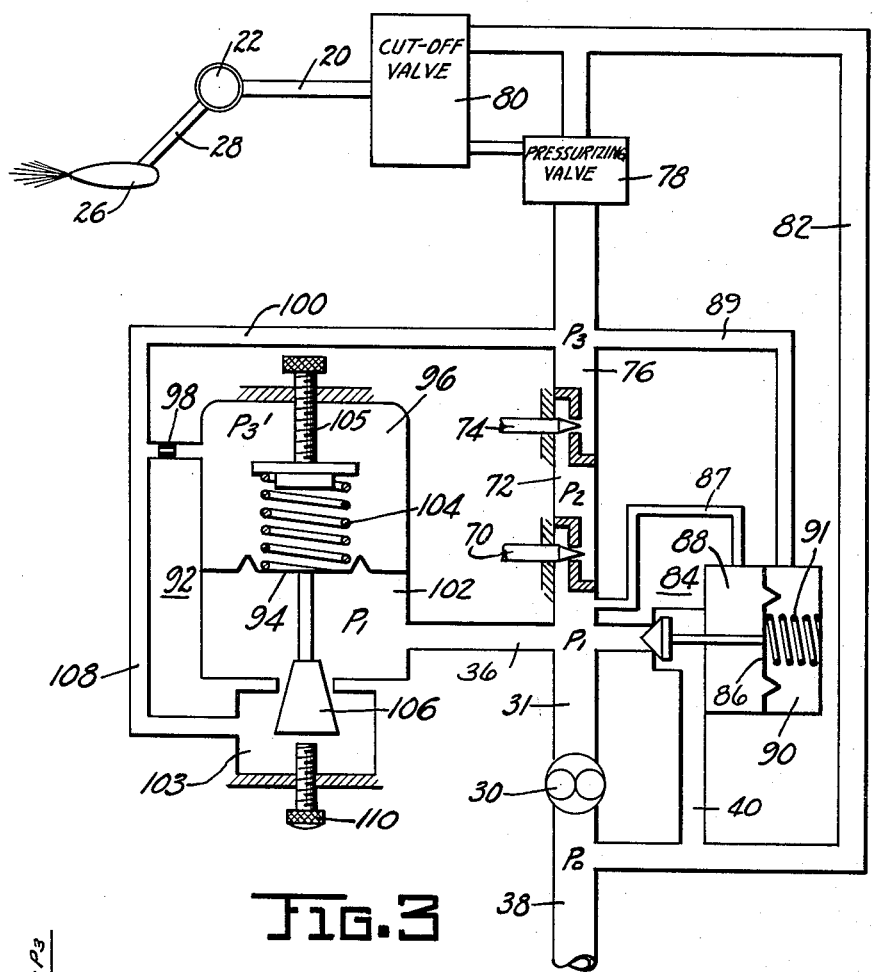
Figure 3 is a schematic view of one modification of the present invention.

Figure 2 shows a main fuel control in schematic form similar to that which might be used with the devices of Figures 3 and 5. The fuel metering unit generally indicated at 18 is adapted to control the flow of liquid fuel to the burners 26 and comprises a suitable housing or a casing 125 provided with a fuel inlet conduit 31 downstream of the engine driven fuel pump 30. Fuel from the conduit 31 flows across valve port 135 into an unmetered fuel chamber D and thence by way of conduit 72, and metering restriction 137 to discharge conduit 76. Port 135 is controlled by a regulating valve 70 having a stem 139 operatively connected to diaphragms 140 and 141 which form movable walls of metered chamber C, the differential control chamber A and unmetered fuel chamber D. The area of the metering orifice or restriction 137 is regulated by valve 74 controlled in a manner to be described.

A passage 143 leads from chamber C to an impeller chamber 144, the latter communicating with chamber A through passage 145, variable orifice 146, and passage 147. A centrifugal impeller or hydraulic governor 148 is mounted on shaft 49 having a drive connection with the turbine as illustrated in Figure 1. Thus the impeller 148 is driven in direct relation to turbine and compressor speed and at a fixed area of orifice 146 will produce a pressure differential between chamber C and a chamber A proportional to the square of engine speed.

A passage 150 having a bleed or restriction 151 therein communicates chamber A with the metered fuel passage or discharge conduit 76.

The diaphragms 140 and 141 may be of equal effective area, and a spring 152 backed by an adjusting screw 153 engages the rear end portion of the valve stem 139 and serves as means whereby the effective differential pressure across the diaphragm 140 and hence across the metering valve 74 may be adjusted within certain limits relative to the differential across the diaphragm 141. This spring represents a constant which may vary in accordance with the idle or low speed fuel requirements of different types of engines or gas turbines; it may serve to modify the effective differential pressure produced by the pump or impeller 148.

The metering differential may be corrected for changes in air density by means of a capsule 154 responsive to changes in pressure and temperature and located at a point where it will be exposed to the air flowing to the engine or to the atmosphere. A needle 155 is connected to the movable end of the capsule 154 and projects into the orifice 146 to vary the effective area of the latter and thus vary the effective differential across diaphragm 141 and hence the differential across diaphragm 140 and metering valve 74.

Secured on shaft 49 and rotating therewith is a mechanical allspeed governor 156 including weights 156' which control the position of the sleeve 157 slidingly mounted on a reduced extension of such shaft. A lever 158 is pivotally supported and fulcrumed at 159; and at its one end said lever is provided with a ball-headed fork 60 engaging in an annular recess provided with the outer end of valve 74, and at its opposite end with another fork 161 engaging in similar recess provided in an enlargement of the sleeve 157. The power control lever 42 is connected through a link 46 and bell crank 164 with the outer free end of spring 165 which at its inner end bears against the adjacent end of sleeve 157.

Assuming the metering unit to be empty, the pressure differential across diaphragms 140 and 141 will be zero and valve 70 will open under the influence of spring 152. When the fuel pump starts, chambers D, C, and A will fill in successive order and fuel will also flow through the conduits 76 and 20 to the manifold ring 22 and thence to the burner nozzles 26.

The pump 30 operates at a fixed speed with respect to the speed of the engine; and for a given area of the orifice 137 and altitude or density control 146 it will produce a pressure differential in chambers C and A proportional to the square of engine speed and tending to open valve 70. As valve 70 opens, the pressure in chamber D increases until the pressure differential across diaphragm 140 balances the force on diaphragm 141. Assuming the diaphragms 140 and 141 to be of equal effective area, the pressure in chamber C will be balanced out and any change in pressure in chamber A will vary the differential across the diaphragm 141 and will correspondingly increase or decrease the pressure in chamber D.

The pressure differential between chambers D and C is imposed across metering valve 74 and since this differential is substantially proportional to the square of engine speed, for any given position of needle 155, the velocity and hence the weight of fuel flow through the orifice will be proportional to the square root of this differential or to the speed directly.

In Figure 3 there is shown the fuel supply pump 30 having an inlet fuel conduit 38 connected to the fuel pump 30 and an outlet fuel conduit 31 connected to that pump. A regulator valve 70 is connected between the fuel conduit 31 containing fuel at pressure $P_1$ and a second fuel conduit 72 containing fuel at pressure $P_2$. A metering valve 74 is shown connected between the latter fuel conduit 72 and the third fuel conduit 76 containing fuel at pressure $P_3$. The fuel conduit 76 is connected to the fuel nozzle 26 through the conventional pressurizing valve 78 and cut-off valve 80 and the fuel conduit 20, the fuel supply manifold 22 and the individual fuel line 28. The pressurizing valve 78 and the cut-off valve 80 are connected in the well known manner to the inlet fuel conduit 38 containing fuel at inlet pump pressure $P_0$ through the fuel conduit 82. A by-pass fuel control valve 84 is shown connected between the pump outlet fuel conduit 31 and the pump inlet fuel conduit 38. The by-pass valve 84 includes a control diaphragm 86 which is exposed at a first side to control fuel at pressure $P_1$ within fuel chamber 88, which latter fuel chamber is connected to the fuel conduit 31 by means of conduit 87. The control diaphragm 86 at its second side is exposed to control fuel at pressure $P_3$ within the fuel chamber 90, which latter fuel chamber 90 is connected to the third fuel conduit 76 by means of conduit 89. A compression spring member 91 is provided within the fuel chamber 90 as shown to provide a pressure head control device.

A starting fuel control valve 92 includes a control diaphragm 94. A first side of the control diaphragm member 94 is exposed to control fuel at pressure $P_3'$ within the fuel chamber 96, which latter chamber is connected through a control orifice or bleed 98 to the fuel conduit 76 including fuel at pressure $P_3$ through the connecting fuel conduit 100. The control orifice or bleed 98 is provided to permit a control of starting valve closure with respect to time as a further means of controlling the fill time of the fuel supply manifold 22. The second side of the control diaphragm member 94 is exposed to control fuel at pressure $P_1$ within the fuel chamber 102, which fuel chamber 102 is connected to outlet fuel conduit 31 by way of conduit 36. Within the fuel chamber 96 there is provided a compression spring member 104, with the compressive stress of that member being adjustable by an adjusting support member 105, said spring 104 acting against the control diaphragm member 94 as shown in Figure 3. The control diaphragm member 94 controls the position of the control valve 106 to thereby control the flow of fuel from the fuel chamber 102 to the fuel chamber 103 and hence to the fuel conduit 76 through the connecting fuel conduits 108 and 109. An adjustable maximum open position stop 110 is provided to control the position of the starting fuel control valve 106.

In Figure 4 there is shown control apparatus suitable for use with cam type fuel controls and in accordance with the present invention. Like identification numbers have been used in Figure 4 similar to those used in Figure 3 where like parts are to be described. In Figure 4 the fuel supply pump 30 is connected between an inlet fuel conduit 38 and an outlet fuel conduit 31. A metering or control orifice valve member 74 is connected between the outlet fuel conduit 31 and the fuel conduit 76 connected through the pressurizing valve 78 and the cut-off valve 80 to the fuel nozzle 26 through the fuel supply manifold 22 and the connecting fuel conduits 20 and 28. The by-pass valve 84 is shown connected to by-pass fuel from the outlet fuel conduit 31 containing fuel at pressure $P_1$ to the inlet fuel conduit 38 containing fuel at inlet pump pressure $P_0$. The control diaphragm member 86 of the by-pass valve 84 is positioned between fuel chambers 88 and 90 containing control fuel at respectively fuel pressures $P_1$ and $P_3$. In this way a constant head is maintained across the metering valve 74. The starting fuel control valve 92 is connected between the fuel conduit 31 containing fuel at pressure $P_1$ and the fuel conduit 76 containing fuel at pressure $P_3$ in a manner similar to that shown in Figure 3.

In Figure 5 there is shown control apparatus in accordance with the present invention and suitable for a speed density type of fuel control wherein a fixed head is maintained across the regulating valve 70 only by the by-pass control valve 84 and the area of the metering valve 74 is controlled by a first predetermined engine operating parameter such as the pilot's manual control throttle and the head or fuel pressure differential across the metering valve 74 is controlled by the regulating valve 70 as a function of any desired predetermined engine operating parameter such as engine speed, engine operating temperature, density of inlet air and the like. The apparatus components shown in Figure 5 which are similar to those shown in Figures 3 and 4 have been identified with like numerals.

Figure 6:
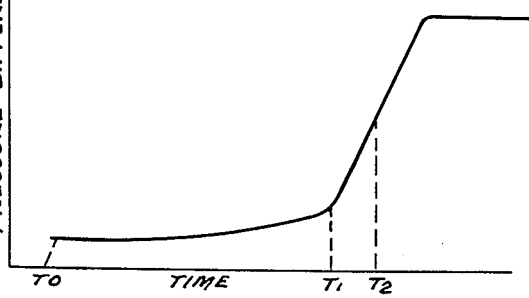
Figure 6 is a curve chart or graph which illustrates the operation of the fuel control apparatus of Figure 3.

In Figure 6 there is shown a curve or chart illustrating as a function of time the pressure difference or pressure head maintained between pump outlet fuel conduit 31 at pressure $P_1$ and the fuel conduit 76 containing fuel at pressure $P_3$ as shown in Figure 3. The time $T_0$ corresponds to the opening of the cut-off valve 80 shown in Figures 3, 4 and 5. The time $T_1$ corresponds to the time when the regulator valve 70 of Figures 3 and 5 starts to close. And the time $T_2$ is when the starting valve 92 begins to close. The upper constant pressure difference portion of the curve represents the final regulated head.

Figure 7:
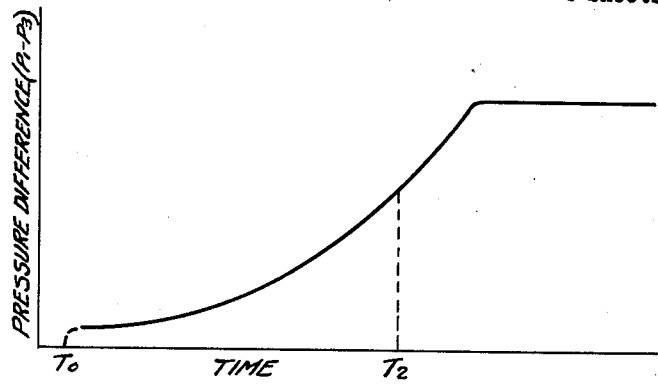
Figure 7 is a curve chart or graph illustrating the operation of the fuel control apparatus as shown in Figure 4.

In Figure 7 there is shown the pressure difference $P_1—P_3$ between the fuel conduit 31 containing fuel at pressure $P_1$ and the fuel conduit 76 containing fuel at pressure $P_3$ as shown in Figure 4. The times $T_0$ and $T_2$ are the same as explained above relative to Figure 6.

Figure 8:
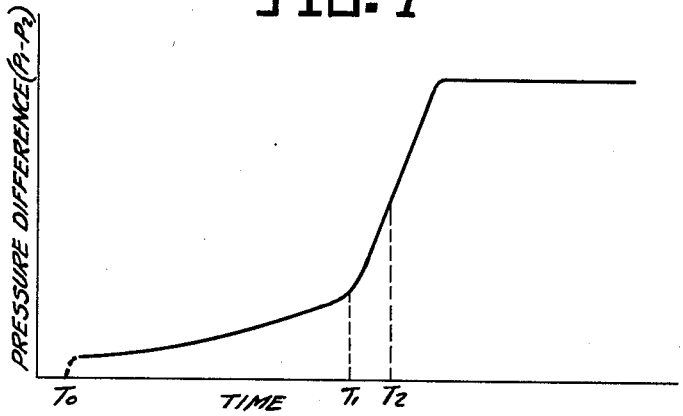
Figure 8 is a curve chart or graph illustrating the operation of the fuel control apparatus shown in Figure 5.

The curve or chart shown in Figure 8 applies to the control apparatus shown in Figure 5 and illustrates the pressure difference $P_1—P_2$ as a function of time. The times $T_0$, $T_1$ and $T_2$ are the same as explained above relative to Figure 6.

Figure 9:
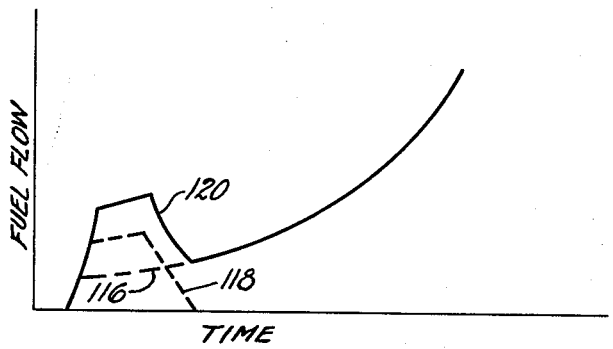
Figure 9 is a curve chart or diagram illustrating the operation of the fuel control apparatus in accordance with the present invention.

In Figure 9 there is shown a curve chart or graph illustrating the fuel flow to the fuel nozzles as a function of time for the control apparatus of each of Figures 3, 4 or 5. The curve 116 illustrates the operation of the fuel metering path including the metering valve 74. The curve 118 illustrates the operation of the starting valve 92. And the curve 120 illustrates the total fuel flow through the latter two valves.

In operation of the fuel control apparatus shown in Figures 1 through 5 a diaphragm operated starting fuel control valve is placed in parallel with the main metering circuit of the fuel control apparatus to provide a second path of fuel in excess of that normally metered by the fuel control through the primary fuel metering path. The starting valve will remain open during the starting operation of the internal combustion engine, and normally during the cranking period will permit full pump output to be discharged into the engine fuel supply manifold until the pressure drop $P_1—P_3$ as shown in Figures 2 through 5 exceeds a predetermined value as a result of the increasing fuel flow from the fuel pump 30 as the engine operational speed increases. When this predetermined specific value of $P_1—P_3$ is exceeded, the diaphragm member 94 shown in Figures 3 through 5 exceeds the spring load due to compression spring 104 such that the starting valve member 106 is forced closed to thereby prevent the flow of additional fuel through the fuel conduits 108 and 100 to the fuel conduit 76.

During the above starting period the by-pass valve 84 shown in Figures 3 through 5 has remained closed since the pressure differential $P_1—P_3$ of Figures 3 and 4 and $P_1—P_2$ of Figure 5 has not reached a value sufficiently high to permit the operation of the by-pass valve 84. Also the regulator valve 70 shown in Figures 3 and 5 is partially closing to maintain normal fuel flow through the metering valve. However, in conjunction with the closing of the starting valve 106, the regulator valve in Figures 3 and 5 closes to prevent the excess fuel due to the closing of the starting valve from flowing to the main metering valve. This causes the $P_1—P_3$ fuel pressure differential to increase to a value whereby the by-pass valve is brought into operation and this excess amount of fuel is returned to the pump inlet fuel conduit 38. In this respect the $P_1—P_3$ fuel pressure differential maintained by the by-pass valve in the apparatus of Figures 3 through 5 is greater than that required to close the starting valve 92 such that the latter starting valve 92 is thereby held closed during all normal operation of the fuel control apparatus after the initial starting time period.

As shown in Figure 3 the fuel control apparatus in accordance with the present invention is applicable where a regulator valve 70 is used to control the pressure differential across the metering valve 74 and a by-pass valve 84 is used to control the pressure drop or differential across the series combination of the regulator valve 70 and the metering valve 74.

As shown in Figure 4 the fuel control apparatus in accordance with the present invention is applicable to a fuel control system wherein the regulator valve is omitted and the by-pass valve is operative to control the fuel pressure differential across the metering valve 74.

As shown in Figure 5 the fuel control apparatus in accordance with the present invention is also applicable to a fuel control system wherein the by-pass valve is responsive to $P_2$ pressure instead of $P_3$ pressure within the fuel conduit 76 such that the by-pass valve 84 maintains a desired pressure differential or fuel head $P_1—P_2$ across the regulator valve 70.

In this respect the fuel control apparatus in accordance with Figure 3 is suitable for the speed density type of fuel control wherein a fixed fuel pressure differential or head is maintained by the by-pass valve 84 across the series combination of the regulator valve 70 and the metering valve 74 and the actual fuel control is obtained by varying the area of the metering valve 74 in response to some engine operating parameter such as manual throttle position and controlling the head across the metering valve 74 by the regulator valve 70 in response to desired engine operating parameters such as engine speed, engine operational temperature and the like. For an illustration of a control system of this type, reference may be made to Patent Nos. 2,518,276 and 2,616,508 by F. C. Mock and assigned to the same assignee as the present invention.

Relative to Figure 4 the fuel control apparatus shown in Figure 4 is suitable for a cam type of fuel control system wherein a fixed head is maintained across the metering valve 74 by the by-pass valve 84 and the effective area of the metering orifice of the metering valve 74 is controlled by desired engine operational parameters for the desired control of the engine. In this respect a reference may be made to the copending patent application Serial No. 248,402, now abandoned, filed September 26, 1951 by H. C. Zeisloft and assigned to the same assignee as the present application.

Relative to Figure 5 the illustrated control apparatus is suitable for use with a speed density type of fuel control system wherein a fixed head is maintained across the regulator valve 70 by the by-pass valve 84 and the area of the metering valve 74 is controlled in response to a predetermined engine operational parameter such as the control throttle scheduling, and the head across the metering valve 74 is controlled by the regulator valve 70 in response to predetermined engine operational parameters such as speed and engine temperatures and the like. In this respect a reference may be made to Patent No. 2,581,275 by F. C. Mock and assigned to the same assignee as the present application.

It should be noted that the present control apparatus is responsive to fluid pressures and fluid pressure differences within the system itself, and is not responsive to atmospheric pressures per se. Therefore, any changes or variance in the output of fuel pump 30 due to deterioration or other causes will have less effective disturbance on the control operation, and further, any undesirable fuel flow restrictions that may occur along the fuel flow path will likewise create less of a control disturbance.

Although only three embodiments of the present invention have been schematically illustrated and described,

I claim:

1. In a fuel system for a combustion engine said engine including a fuel manifold, a first conduit for supplying fuel to said manifold, a main fuel control including a first valve in said first conduit, and a pump having its output variable with the speed of said engine for supplying fuel under pressure to said control, the combination of means providing a separate flow of starting fuel to said manifold comprising a second conduit downstream of said pump and in parallel with said first valve, a second valve in said second conduit for controlling the flow therethrough, a chamber, a pressure responsive member dividing said chamber into two compartments having one compartment in communication with said first conduit downstream of said pump and upstream of said first valve and the other compartment in communication with said first conduit downstream of said first valve, said pressure responsive member further being connected to said second valve to move said second valve in a closing direction as a pressure of fluid in said one compartment increases, means restricting flow between said other compartment and said first conduit, and a resilient member in said second named compartment effective to aid the fuel pressure therein against said pressure responsive member.

2. In a fuel system for a combustion engine said system including a fuel manifold, a first conduit for supplying fuel to said manifold, a main fuel control including a metering valve in said first conduit, and a pump having its output variable with speed of said engine for supplying fuel under pressure to said control, the combination of means providing a separate flow of starting fuel to said manifold comprising a second conduit downstream of said pump and in parallel with said metering valve, a valve in said second conduit for controlling the flow therethrough, a chamber, a diaphragm dividing said chamber into two compartments having one compartment in communication with said first conduit downstream of said pump and upstream of said metering valve and the other compartment in communication with said first conduit downstream of said metering valve, said diaphragm further being connected to said valve to move said valve in a flow preventing direction as the pressure of fluid in said one compartment increases, means restricting flow between said other compartment and said first conduit, and a resilient member in said second named compartment effective to aid the fuel pressure therein against said diaphragm.

3. In a fuel system for a combustion engine said system including a fuel manifold, a first conduit for supplying fuel to said manifold, a main fuel control including a regulating valve and a metering valve in said first conduit, a pump having its output variable with the speed of said engine for supplying fuel under pressure to said control, and a by-pass valve for maintaining a constant pressure drop across said regulating valve, the combination of means providing a separate flow of starting fuel to said manifold comprising a second conduit downstream of said pump and in parallel with said regulating valve and said metering valve, a valve in said second conduit for controlling the flow therethrough, a chamber, a diaphragm dividing said chamber into two compartments and connected to said valve having one compartment in communication with said first conduit downstream of said pump and upstream of said metering valve and the other compartment in communication with said conduit downstream of said metering valve, means restricting flow between said other compartment and said first conduit, and a resilient member in said second compartment effective to aid the fuel pressure therein against said diaphragm.

4. In a fuel system for a combustion engine said system including a fuel manifold, a first conduit for supplying fuel to said manifold, a main fuel control including a regulating valve and a metering valve in said first conduit, a pump having its output variable with the speed of said engine for supplying fuel under pressure to said control, and a by-pass valve for maintaining a constant pressure drop across said regulating valve and said metering valve, the combination of means providing a separate flow of starting fuel to said manifold comprising a second conduit downstream of said pump and in parallel with said metering valve and said regulating valve, a valve in said second conduit for controlling the flow therethrough, a chamber, a diaphragm dividing said chamber into two compartments and connected to said valve having one compartment in communication with said first conduit downstream of said pump and upstream of said metering valve and the other compartment in communication with said conduit downstream of said metering valve, means restricting flow between said other compartment and said first conduit, and a resilient member in said second compartment effective to aid the fuel pressure therein against said diaphragm.

5. In a fuel system for a combustion engine said system including a fuel manifold, a first conduit for supplying fuel to said manifold, a main fuel control including a first valve in said first conduit, and a pump having its output variable with the speed of said engine for supplying fuel under pressure to said control, the combination of means providing a separate flow of starting fuel to said manifold comprising a second conduit downstream of said pump and in parallel with said first valve, a second valve in said second conduit for controlling the flow therethrough, a chamber, a pressure responsive member dividing said chamber into two compartments having one compartment in communication with said first conduit downstream of said pump and upstream of said first valve and the other compartment in communication with said first conduit downstream of said first valve, said pressure responsive member further being connected to said second valve to move said second valve in a flow preventing direction as the pressure of fluid in said one compartment increases, and means restricting flow between said other compartment and said first conduit.

References Cited in the file of this patent

UNITED STATES PATENTS

| 2,422,808 | Stokes | June 24, 1947 |
| 2,769,488 | Harris et al. | Nov. 6, 1956 |

FOREIGN PATENTS

| 664,807 | Great Britain | Jan. 9, 1952 |